United States Patent
Grant et al.

(10) Patent No.: US 11,303,517 B2
(45) Date of Patent: Apr. 12, 2022

(54) SOFTWARE PATCH OPTIMIZATION

(71) Applicant: INTERNATIONAL BUSINESS MACHINES CORPORATION, Armonk, NY (US)

(72) Inventors: Robert Huntington Grant, Marietta, GA (US); Jacob Covell, New York, NY (US); Thomas Jefferson Sandridge, Tampa, FL (US); Kevin Huang, Rutherford, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 16/735,808

(22) Filed: Jan. 7, 2020

(65) Prior Publication Data

US 2021/0211349 A1 Jul. 8, 2021

(51) Int. Cl.
*H04L 41/082* (2022.01)
*H04L 43/0817* (2022.01)
(Continued)

(52) U.S. Cl.
CPC .............. *H04L 41/082* (2013.01); *G06F 8/65* (2013.01); *H04L 12/4641* (2013.01);
(Continued)

(58) Field of Classification Search
CPC .......... G06F 40/197; G06F 8/71; G06F 9/328; G06F 8/65; G06F 8/60; G06F 9/44536;
(Continued)

(56) References Cited

U.S. PATENT DOCUMENTS 7,490,319 B2 * 2/2009 Blackwell ........... G06F 11/3664
717/124
8,060,074 B2 11/2011 Danford et al.
(Continued)

FOREIGN PATENT DOCUMENTS

| EP | 3364602 | 8/2018 |
|---|---|---|
| JP | 2003131907 | 5/2003 |

OTHER PUBLICATIONS

Zeng et al., "IOTSim: a Cloud based Simulator for Analysing IoT Applications", https://www.researchgate.netpublication/301844559_IOTSim_a_Cloud_based_Simulator_for_Analysing_IoT_Applications, Journal of Systems Architecture, 2016, 24 pages.
(Continued)

*Primary Examiner* — Moustafa M Meky
*Assistant Examiner* — Kidest Mendaye
(74) *Attorney, Agent, or Firm* — Daniel Yeates; Andrew D. Wright; Roberts Calderon Safran & Cole, P.C.

(57) ABSTRACT

A computer-implemented method includes: creating a virtualized copy of a mesh network including devices; measuring an unpatched performance metric value for the virtualized copy of each of the devices; applying a first software patch to the virtualized copy of each of the devices; measuring a patched first performance metric value for the virtualized copy of each of the devices; comparing, for each of the devices, the patched performance metric value to the unpatched performance metric value; and preventing the application of the first software patch to a first device of the devices as a result of the comparing.

19 Claims, 12 Drawing Sheets

(51) Int. Cl.
*H04L 41/0866* (2022.01)
*G06F 8/65* (2018.01)
*H04L 43/16* (2022.01)
*H04L 12/46* (2006.01)

(52) U.S. Cl.
CPC ...... *H04L 41/0866* (2013.01); *H04L 43/0817* (2013.01); *H04L 43/16* (2013.01)

(58) Field of Classification Search
CPC ............... G06F 11/368; G06F 11/3684; G06F 11/3692; G06F 11/3695; H04L 41/082; H04L 41/0866; H04L 43/0817; H04L 12/4641; H04L 43/16
USPC .......................................................... 709/223
See application file for complete search history.

(56) References Cited

U.S. PATENT DOCUMENTS

| | | | | |
|---|---|---|---|---|
| 8,407,696 | B2* | 3/2013 | Alpern | G06F 8/65 |
| | | | | 718/1 |
| 8,473,484 | B2* | 6/2013 | Egan | G06F 16/24542 |
| | | | | 707/718 |
| 9,565,192 | B2 | 2/2017 | Chillappa et al. | |
| 9,645,808 | B1 | 5/2017 | Turpie | |
| 9,753,796 | B2 | 9/2017 | Mahaffey et al. | |
| 10,476,742 | B1* | 11/2019 | Szarvas | H04L 41/0869 |
| 2010/0257513 | A1* | 10/2010 | Thirumalai | G06F 16/2365 |
| | | | | 717/134 |
| 2014/0325212 | A1* | 10/2014 | Della Corte | G06F 21/6272 |
| | | | | 713/164 |
| 2016/0261465 | A1 | 9/2016 | Gupta et al. | |
| 2017/0019422 | A1* | 1/2017 | Makowski | H04L 63/1433 |
| 2017/0195171 | A1 | 7/2017 | Wohlert et al. | |
| 2018/0041537 | A1 | 2/2018 | Bloxham et al. | |
| 2018/0063250 | A1 | 3/2018 | Justin et al. | |
| 2018/0131574 | A1* | 5/2018 | Jacobs | G06F 8/65 |
| 2018/0136921 | A1* | 5/2018 | Pfleger de Aguiar | G06Q 10/06 |
| 2018/0183874 | A1* | 6/2018 | Cook | H04L 41/0816 |
| 2019/0058632 | A1 | 2/2019 | Schneider et al. | |
| 2019/0171187 | A1 | 6/2019 | Celle et al. | |
| 2019/0294525 | A1* | 9/2019 | Scheiner | G06F 11/3608 |
| 2020/0057625 | A1* | 2/2020 | Livne | G06F 8/433 |
| 2021/0021462 | A1* | 1/2021 | Chaignon | H04L 41/0627 |
| 2021/0072977 | A1* | 3/2021 | Giri | G06F 8/63 |

OTHER PUBLICATIONS

Dua, "Assess performance impact of Spectre and Meltdown patches using vRealize Operations Manager", https://blogs.vmware.com/management/2018/01/assess-performance-impact-spectre-meltdown-patches-using-vrealize-operations-manager.html, VMware Blogs, Jan. 20, 2018, 9 pages.

Gurijala, "Performance Testing Internet of Things (IOT)", https://www.infosys.com/IT-services/validation-solutions/features-opinions/Documents/performance-testing-iot.pdf, Infosys, 2018, 4 pages.

Prabhu. "IoT Automation—How Feasible It Is?", https://www.indiumsoftware.com/blog/iot-automated-testing/, Indium, Aug. 22, 2017, 5 pages.

Anonymous, "Why IoT needs simulation instead of load testing?", https://iotify.io/why-iot-needs-simulation-instead-of-load-testing/, IOTIFY, accessed Jul. 3, 2019, 3 pages.

Mell et al., "The NIST Definition of Cloud Computing", NIST, Special Publication 800-145, Sep. 2011, 7 pages.

* cited by examiner

| | Device Performance Assessment |
|---|---|
| | Patchless: |
| Latency | |
| CPU | |
| Disk | |
| Memory | |
| Throughput | |

FIG. 5

| | Network Performance Assessment |
|---|---|
| | Patchless: |
| E2E Latency | |
| E2E Throughput | |

FIG. 6

| | Device Performance Score | | | | |
|---|---|---|---|---|---|
| *Factors:* | Patched | Patchless | Degradation (% Change) | Weight | Threshold |
| Latency | | | | | |
| CPU | | | | | |
| Disk | | | | | |
| Memory | | | | | |
| Throughput | | | | | |
| | | | | Device Performance Score | |

FIG. 7

| | Data Loss Risk Score (per device) | | | | |
|---|---|---|---|---|---|
| *Factors:* | Patched | Patchless | % Change | Weight | Threshold |
| Sensitivity | | | | | |
| Susceptibility | | | | | |
| | | | | Data Loss Risk Score (per device) | |

FIG. 8

| | Cost Impact Per Device | | | | |
|---|---|---|---|---|---|
| *Factors:* | Patched | Patchless | % Change | Weight | Threshold |
| Downtime Cost | | | | | |
| Performance Degradation Cost | | | | | |
| Expected Monetary Impact of Data Loss | | | | | |
| | | | | Cost Impact per Device | |

FIG. 9

|                  | Patched? | | | | |
|---|---|---|---|---|---|
| Configuration ID# | Device A | Device B | Device C | Device D | Device E |
| C-1  | yes | no  | no  | no  | no  |
| C-2  | no  | yes | no  | no  | no  |
| C-3  | no  | no  | yes | no  | no  |
| C-4  | no  | no  | no  | yes | no  |
| C-5  | no  | no  | no  | no  | yes |
| C-6  | yes | yes | no  | no  | no  |
| C-7  | yes | yes | yes | no  | no  |
| C-8  | yes | no  | no  | no  | yes |
| C-9  | yes | yes | yes | yes | no  |
| C-10 | yes | yes | yes | yes | yes |
| C-11 | no  | no  | no  | yes | yes |
| C-12 | no  | no  | yes | yes | yes |
| C-13 | no  | yes | yes | yes | yes |
| C-14 | no  | yes | no  | yes | no  |
| C-15 | yes | no  | yes | no  | yes |
| C-16 | yes | yes | no  | yes | yes |
| C-17 | yes | no  | yes | yes | yes |
| C-18 | no  | yes | yes | yes | yes |
| C-19 | no  | no  | yes | yes | no  |
| C-20 | no  | yes | yes | yes | no  |

FIG. 10

| Factors: | Network Performance Score | | | | |
|---|---|---|---|---|---|
|  | Patched | Patchless | Degradation (% Change) | Weight | Threshold |
| E2E Latency |  |  |  |  |  |
| E2E Throughput |  |  |  |  |  |
|  |  |  |  | Network Performance Score |  |

FIG. 11

| | | Configuration Score | | | |
|---|---|---|---|---|---|
| | Patched? | Device Performance Score | Data Loss Risk Score | Cost Impact Score | Network Performance Score |
| Device 1 | Yes | | | | |
| Device 2 | No | | | | |
| Device 3 | Yes | | | | |
| Device 4 | Yes | | | | |
| Device 5 | No | | | | |
| Weight | | 25% | 20% | 10% | 45% |
| Total Config. Score | | | | | |

FIG. 12

| | Threshold Matrix | | | |
|---|---|---|---|---|
| | Device Performance Threshold | Data Loss Threshold | Cost per Device Threshold | Network Performance Threshold |
| Device 1 | 83 | 69 | 67 | 84 |
| Device 2 | 72 | 74 | 65 | |
| Device 3 | 65 | 79 | 66 | |
| Device 4 | 79 | 88 | 67 | |
| Device 5 | 78 | 91 | 83 | |

FIG. 13

| Configuration ID # | Total Configuration Score |
|---|---:|
| C-1 | 76.00 |
| C-2 | 74.00 |
| C-3 | 72.00 |
| C-4 | 79.00 |
| C-5 | 74.00 |
| C-6 | 73.00 |
| C-7 | 79.00 |
| C-8 | 71.00 |
| C-9 | 63.00 |
| C-10 | 68.00 |
| C-11 | 63.00 |
| C-12 | 69.00 |
| C-13 | 58.00 |
| C-14 | 52.00 |
| C-15 | 89.00 |
| C-16 | 56.00 |
| C-17 | 64.00 |
| C-18 | 61.00 |
| C-19 | 60.00 |
| C-20 | 62.00 |

FIG. 14

|                   | Patched? | | | | |
|------------------:|----------|----------|----------|----------|----------|
| Configuration ID# | Device A | Device B | Device C | Device D | Device E |
| C-1               | yes      | no       | no       | no       | no       |
| C-2               | no       | yes      | no       | no       | no       |
| C-3               | no       | no       | yes      | no       | no       |
| C-4               | no       | no       | no       | yes      | no       |
| C-5               | no       | no       | no       | no       | yes      |
| C-6               | yes      | yes      | no       | no       | no       |
| C-7               | yes      | yes      | yes      | no       | no       |
| C-8               | yes      | no       | no       | no       | yes      |
| C-9               | yes      | yes      | yes      | yes      | no       |
| C-10              | yes      | yes      | yes      | yes      | yes      |
| C-11              | no       | no       | no       | yes      | yes      |
| C-12              | no       | no       | yes      | yes      | yes      |
| C-13              | no       | yes      | yes      | yes      | yes      |
| C-14              | no       | yes      | no       | yes      | no       |
| C-15          | yes  | no   | yes  | no   | yes  |
| C-16              | yes      | yes      | no       | yes      | yes      |
| C-17              | yes      | no       | yes      | yes      | yes      |
| C-18              | no       | yes      | yes      | yes      | yes      |
| C-19              | no       | no       | yes      | yes      | no       |
| C-20              | no       | yes      | yes      | yes      | no       |

FIG. 15

SOFTWARE PATCH OPTIMIZATION

BACKGROUND

Aspects of the present invention relate generally to mesh networks and, more particularly, to applying software and/or firmware patches to devices on a mesh network.

Mesh networks can include a large number of devices that require software and/or firmware patches/updates. The devices include computers, smart appliances, automobiles and other vehicles, personal electronic devices, and other devices that are interconnected on a network.

SUMMARY

In a first aspect of the invention, there is a computer-implemented method including: creating, by a computer device, a virtualized copy of a mesh network, the virtualized copy of the mesh network comprising virtualized copies of a plurality of devices on the mesh network; measuring, by the computer device, an unpatched first performance metric value for the virtualized copy of each of the devices, the unpatched first performance metric value being a value of a first performance metric for the virtualized copy of each of the devices before a first software patch is applied to the virtualized copies of the devices; applying, by the computer device, the first software patch to the virtualized copy of each of the devices; measuring, by the computer device, a patched first performance metric value for the virtualized copy of each of the devices, the patched first performance metric value being a value of the first performance metric for the virtualized copy of each of the devices after the applying; comparing, by the computer device and for each of the devices, the patched first performance metric value to the unpatched first performance metric value; and preventing, by the computer device, the application of the first software patch to a first device of the devices as a result of the comparing.

In another aspect of the invention, there is a computer program product, the computer program product comprising one or more computer readable storage media having program instructions collectively stored on the one or more computer readable storage media, the program instructions executable to: create a virtualized copy of a mesh network, the virtualized copy of the mesh network comprising virtualized copies of a plurality of devices on the mesh network; measure an unpatched first performance metric value for the virtualized copy of each of the devices, the unpatched first performance metric value being a value of a first performance metric for the virtualized copy of each of the devices before a first software patch is applied to the virtualized copies of the devices; apply the first software patch to the virtualized copy of each of the devices; measure a patched first performance metric value for the virtualized copy of each of the devices, the patched first performance metric value being a value of the first performance metric for the virtualized copy of each of the devices after the applying; compare, for each of the devices, the patched first performance metric value to the unpatched first performance metric value; and apply the first software patch to a first device of the devices as a result of the comparing.

In another aspect of the invention, there is system including a processor, a computer readable memory, and a computer readable storage medium. The system includes program instructions to: create a virtualized copy of a mesh network, the virtualized copy of the mesh network comprising virtualized copies of a plurality of devices on the mesh network; measure an unpatched first performance metric value for the virtualized copy of each of the devices, the unpatched first performance metric value being a value of a first performance metric for the virtualized copy of each of the devices before a first software patch is applied to the virtualized copies of the devices; apply the first software patch to the virtualized copy of each of the devices; measure a patched first performance metric value for the virtualized copy of each of the devices, the patched first performance metric value being a value of the first performance metric for the virtualized copy of each of the devices after the applying; compare, for each of the devices, the patched first performance metric value to the unpatched first performance metric value; and prevent the application of the software patch to a first device of the devices as a result of the comparing. The program instructions are stored on the computer readable storage medium for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 shows a chart in accordance with embodiments of the invention.

FIG. 6 shows a chart in accordance with embodiments of the invention.

FIG. 7 shows a chart in accordance with embodiments of the invention.

FIG. 8 shows a chart in accordance with embodiments of the invention.

FIG. 9 shows a chart in accordance with embodiments of the invention.

FIG. 10 shows a chart in accordance with embodiments of the invention.

FIG. 11 shows a chart in accordance with embodiments of the invention.

FIG. 12 shows a chart in accordance with embodiments of the invention.

FIG. 13 shows a chart in accordance with embodiments of the invention.

FIG. 14 shows a chart in accordance with embodiments of the invention.

FIG. 15 shows a chart in accordance with embodiments of the invention.

DETAILED DESCRIPTION

Figure 1:
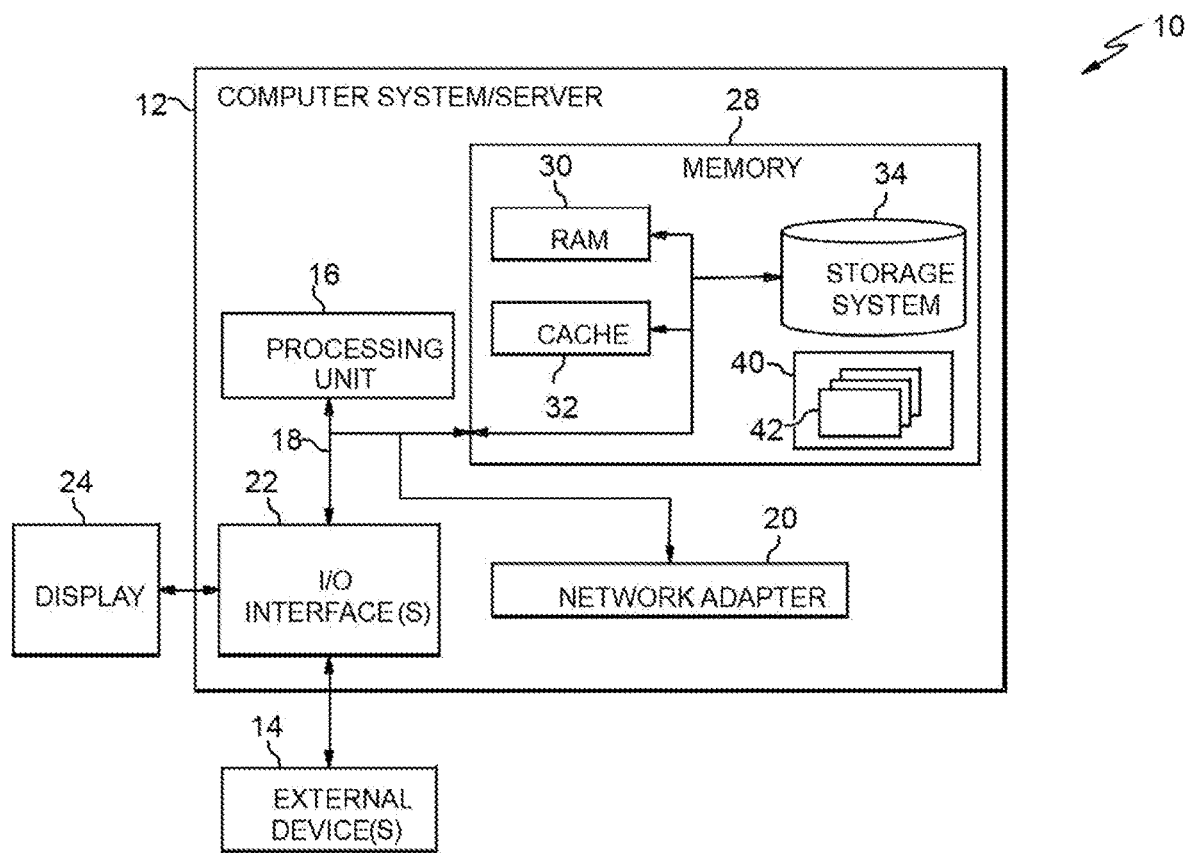
FIG. 1 depicts a cloud computing node according to an embodiment of the present invention.

Aspects of the present invention relate generally to mesh networks and, more particularly, to applying software and/or firmware patches to devices on a mesh network. According to aspects of the invention, a mesh network including devices that are subject to a software/firmware patch is analyzed to determine an optimal patch configuration that patches only some, or all, of the devices. In embodiments, a computer device creates a virtualized copy of a mesh network, the virtualized copy of the mesh network comprising virtualized copies of a plurality of devices on the mesh network; measures an unpatched first performance metric value for the virtualized copy of each of the devices, the unpatched first performance metric value being a value of a first performance metric for the virtualized copy of each of the devices before a first software patch is applied to the virtualized copies of the devices; applies the first software patch to the virtualized copy of each of the devices; measures a patched first performance metric value for the virtualized copy of each of the devices, the patched first performance metric value being a value of the first performance metric for the virtualized copy of each of the devices after the applying; compares, for each of the devices, the patched first performance metric value to the unpatched first performance metric value; and prevents, by the computer device, the application of the first software patch to a first device of the devices as a result of the comparing. In this manner, implementations of the invention determine an optimal patch configuration of the network which includes patching less than all of the devices on the network in order to maintain desired performance and other levels.

Following the discovery of the Meltdown and Spectre security vulnerabilities which exploit all devices with modern processors, many patches being deployed to prevent the exploits are causing degradation in performance on the patched devices. With the discovery of the Foreshadow security flaw and the theorized discovery of many more to come in the immediate future, there is increasing demand to efficiently assess the performance degradation risk associated with the patches prior to deploying them in a product environment. Different devices experience different levels of performance degradation based upon their build (both hardware and software), and different devices also have different levels of risk associated with their potential for sensitive data loss. Given the complex architecture of many IoT systems, defining the associated risk of patching in various configurations becomes a challenge. Embodiments of the invention include methods, products, and systems for analyzing the performance impact and risk associated with applying patches on a number of interconnected devices in the IoT system, while simultaneously developing a plan to apply the patches that minimizes the associated performance degradation and data loss risk.

Embodiments of the invention utilize a risk-adjusted performance simulation in a virtual environment to create a patch rollout plan and continuously optimize the configuration of patches in an IoT mesh network, with respect to performance impact scoring, risk impact scoring, and the cost of applying patches.

In an exemplary embodiment, a manufacturing company wants to assess the performance impact of patching networked devices within a plant. The network is virtualized, creating instances for both patched and un-patched devices. End-to-end benchmarks are executed on each network configuration of patched and un-patched devices. The company establishes thresholds relative to performance impact and data risk to individual devices as well as the entire system. The company also establishes weights which prioritize their requirements. A relative comparison between each configuration is computed. Results from the relative comparison are analyzed based on the established thresholds. A patch deployment plan is created using optimization such as multi-variate analysis or similar optimization algorithms. The system continues to analyze data risk relative to each device and repeats the process based on preestablished thresholds.

Embodiments of the invention may reside on an individual device within the network, within the network, or on a centralized device/hub. Embodiments of the invention may also reside within a cloud computing environment.

Implementations of the invention are improvements to the functioning of a computer. For example, selecting an optimal model configuration from a plurality of network patch configurations modeled on a virtualized copy of a network improves the efficiency of a computer network by selecting the optimal software patch configuration that balances reductions in processing speed with increases in security before applying any software patch configurations to the physical network. In addition, implementations of the invention include features that are not well understood, routine, or conventional activity in the relevant art. For example, selecting an optimal model configuration from a plurality of modeled network patch configurations based on a total configuration score is not well-understood, routine, or conventional.

Embodiments of the invention include a method comprising: configuring a non-patched Internet of Things (IoT) mesh network within a virtual environment; executing performance tests separately on each of a plurality of non-patched devices in the virtualized non-patched IoT mesh network; executing network performance tests on the entire virtualized non-patched IoT mesh network; recording a plurality of performance metrics to measure a baseline performance of each of the virtualized non-patched devices and the virtualized IoT mesh network prior to applying a patch; installing a patch on one or more of the virtualized non-patched devices; executing performance tests independently on each of the one or more patched virtualized devices; determining if any of the recorded performance metrics for the patched virtualized devices fall below user-defined device performance thresholds; in response to determining that one or more of the recorded performance metrics fall below the user-defined device performance thresholds, eliminating any configurations that specifically include the one or more patched virtualized devices; isolating each remaining network configuration from a list of possible simulated network patch configurations; executing device and exchange-to-exchange (E2E) system-level performance tests on each of the remaining simulated network patch configurations within the virtual environment; determining a respective performance impact score associated with each of the remaining simulated network patch configurations based on comparison of results of the device and E2E system-level performance tests from each of the remaining simulated network patch configurations with the baseline performance; selecting the remaining simulated network patch configuration with the highest performance impact score; and outputting the selected remaining simulated network patch configuration for implementation of installing patches on one more devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
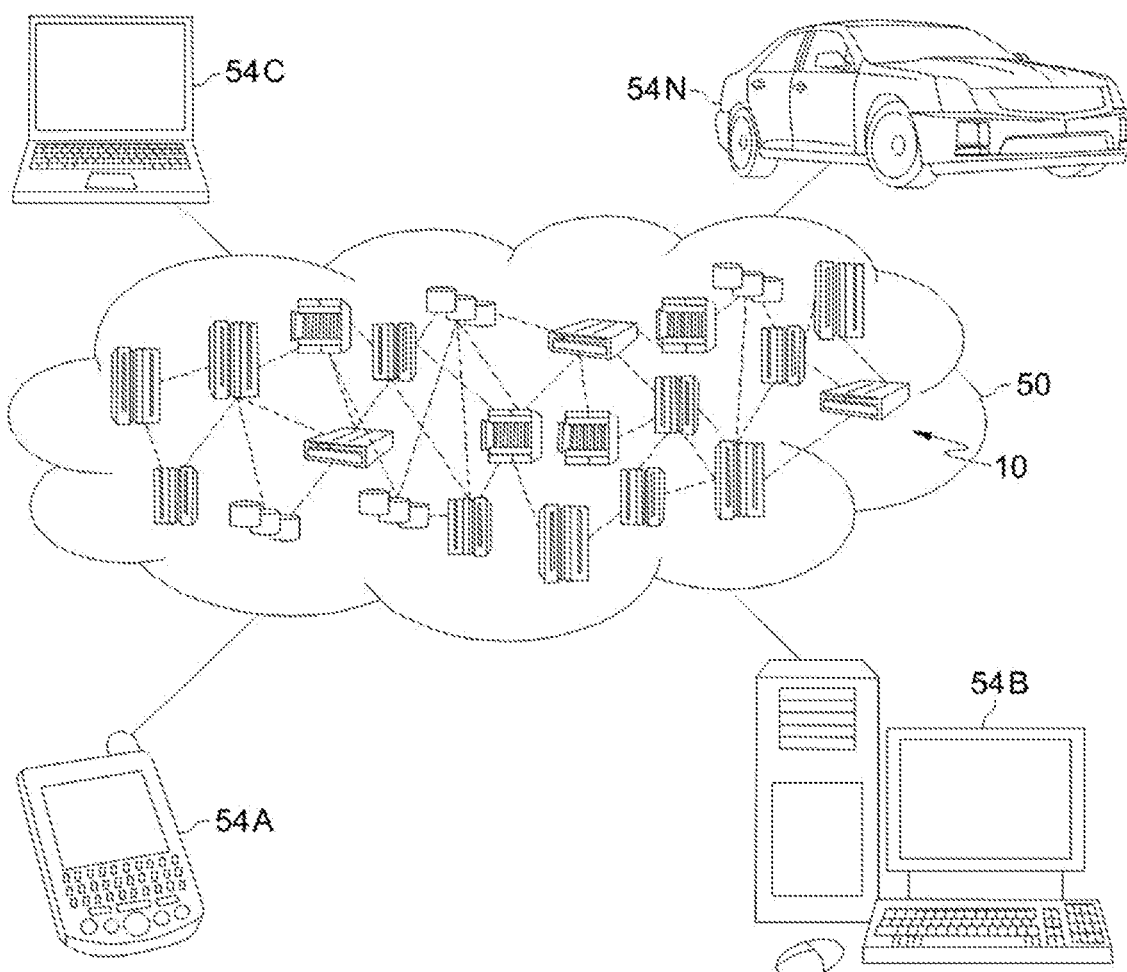
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
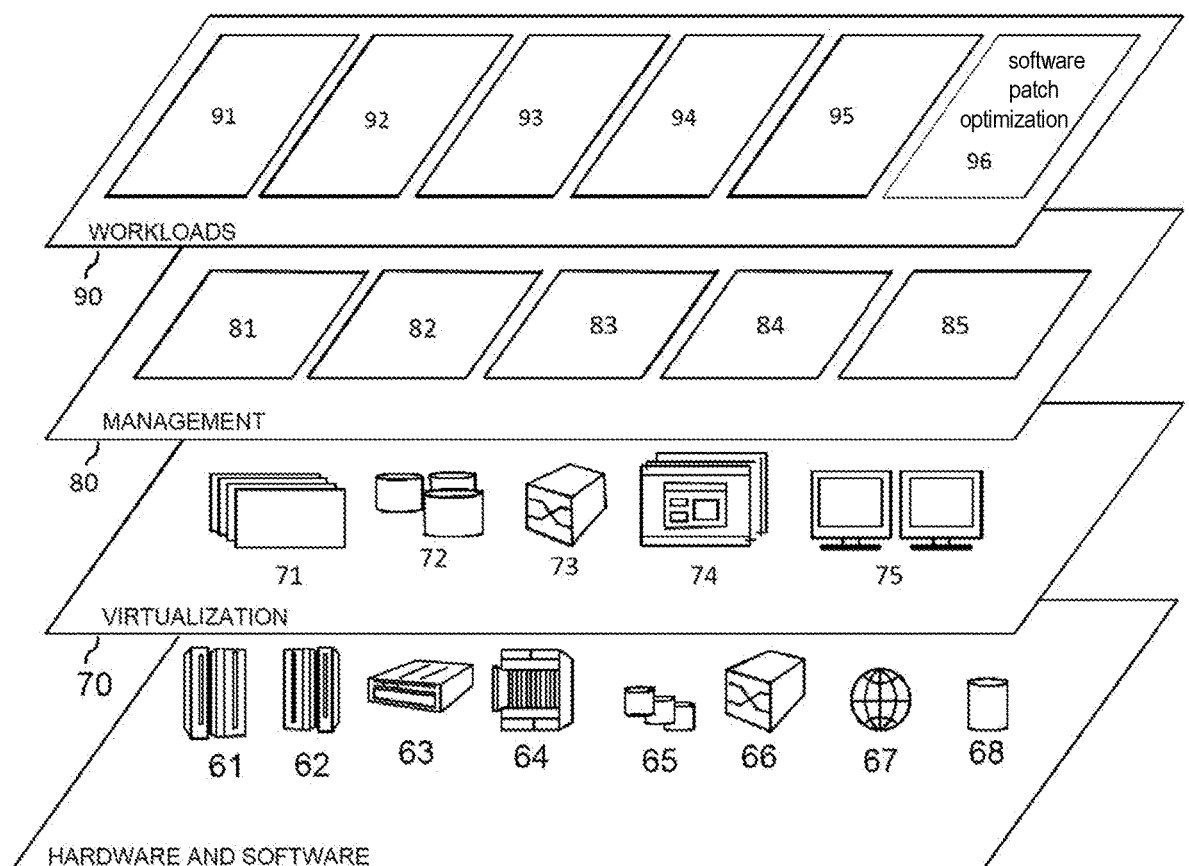
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software patch optimization 96.

Implementations of the invention may include a computer system/server 12 of FIG. 1 in which one or more of the program modules 42 are configured to perform (or cause the computer system/server 12 to perform) one of more functions of the software patch optimization 96 of FIG. 3. For example, the one or more of the program modules 42 may be configured to: create a virtualized copy of a mesh network, the virtualized copy of the mesh network comprising virtualized copies of a plurality of devices on the mesh network; measure an unpatched first performance metric value for the virtualized copy of each of the devices, the unpatched first performance metric value being a value of a first performance metric for the virtualized copy of each of the devices before a first software patch is applied to the virtualized copies of the devices; apply the first software patch to the virtualized copy of each of the devices; measure a patched first performance metric value for the virtualized copy of each of the devices, the patched first performance metric value being a value of the first performance metric for the virtualized copy of each of the devices after the applying; compare, for each of the devices, the patched first performance metric value to the unpatched first performance metric value; and prevent the application of the first software patch to a first device of the devices as a result of the comparing.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
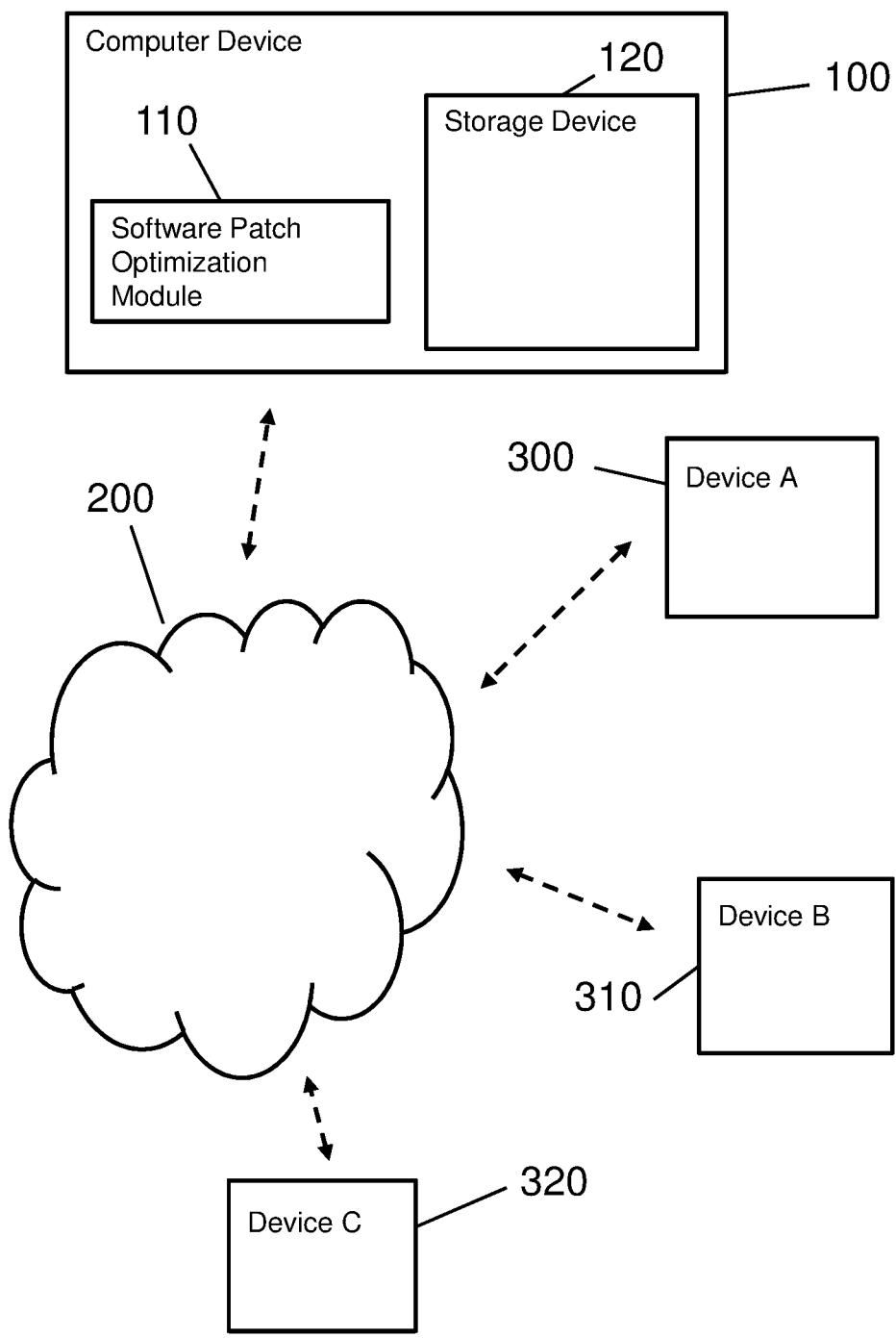
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more mesh networks 200 such as, for example cloud computing environment 50. In this example, computer device 100 includes a software patch optimization module 110, for example, one or more of program modules 42 in FIG. 1, and a storage device 120 such as, for example, storage system 34 in FIG. 1.

FIG. 4 shows three devices 300, 310, 320 (other examples interact with fewer or more than three devices 300, 310, 320). In embodiments, devices 300, 310, 320 are computers, smart phones, smart appliances, machinery, and/or any other device that is connected to other devices through a network. Devices 300, 310, 320 are representative of devices on a network that has hundreds or thousands of devices interconnected by the network.

Embodiments include a method for simulating a software patch application across devices in a mesh network before applying the patch to the network. By simulating the patch application, performance effects of the patch on the network are determined before the network is impacted by the patch application.

In embodiments, software patch optimization module 110 creates a copy of a network (for example, an IoT mesh network), including the devices (for example, devices 300, 310, 320) on the network, within a virtual environment. Once the virtualized copy of the network (virtual network) is created, software patch optimization module 110 runs separate device performance tests on each of the devices in the virtual network and runs network performance tests on the entire virtual network. Software patch optimization module 110 records multiple performance metrics to measure the baseline performance of each of the devices and the virtual network before patches are applied. Software patch optimization module 110 uses these metrics as a benchmark in order to gauge the performance impact associated with various patch configurations.

FIG. 5 is a chart showing an example of performance metrics used by software patch optimization module 110 to measure and record device performance before any patches are applied to set as a baseline in accordance with aspects of the invention. In this example, software patch optimization module 110 runs one or more performance tests on devices 300, 310, 320 and records these metrics for each device. In this example, the one or more performance tests produce the following metrics: latency, CPU, disk, memory, and throughput. Other examples include more or fewer metrics.

FIG. 6 is a chart showing an example of performance metrics used by software patch optimization module 110 to measure and record network performance metrics before any patches are applied to set as a baseline in accordance with aspects of the invention. In this example, software patch optimization module 110 runs one or more performance tests on the virtual network and records these metrics. In this example, the one or more performance tests produce the following metrics: exchange to exchange (E2E) latency and E2E throughput. Other examples include more or fewer metrics.

In embodiments, after software patch optimization module 110 runs the performance tests and records the results for the unpatched devices and unpatched virtual network, the software patch is applied to the devices in the virtual network. In embodiments, the software patch is applied to all of the devices in the virtual network. In embodiments, the software patch is applied to fewer than all of the devices in the virtual network. In embodiments, only one software patch is applied, while in other embodiments, multiple software patches are applied.

In embodiments, software patch optimization module 110 runs performance tests independently on each of the patched devices on the virtual network. Software patch optimization module 110 then determines if any of the recorded performance metrics for the patched devices fall below user-defined device performance thresholds, identifies these "no-patch" scenarios on a device level and eliminates any configurations of the virtual network that specifically include patching these devices. As is explained in more detail below, in embodiments, multiple configurations of the virtual network are tested to determine which configuration produces optimal results. Each of the configurations includes a different combination of patched devices and unpatched devices. Software patch optimization module 110 then isolates each of the remaining network configurations (those that have not been eliminated as a result of a device level no-patch scenario) from the list of possible network patch configurations and runs device and E2E system-level performance tests on each configuration of the virtual network.

FIG. 7 is a chart showing an example of a Device Performance Score and performance metrics used by software patch optimization module 110 to measure and record device performance of each of the patched devices on the virtual network in accordance with aspects of the invention. Software patch optimization module 110 then determines a Device Performance Score from these metrics as shown in FIG. 7. In this example, the same metrics are measured and recorded as are measured and recorded for the unpatched devices (FIG. 5). In embodiments, software patch optimization module 110 makes the following assumptions in determining the Device Performance Score: Device Performance Score equals the aggregate function of Degradation multiplied by Weight for each factor; Weight is user-defined to distinguish a priority per factor; sum of all the Weights equals 100.00; and Threshold defines a limit for each factor which determines a patch/no-patch decision for patching this particular device.

FIG. 8 is a chart showing an example of a Data Loss Risk Score and metrics used by software patch optimization module 110 to determine the Data Loss Risk Score for each of the devices on the virtual network in accordance with aspects of the invention. In embodiments, software patch optimization module 110 determines the Data Loss Risk Score for each device to quantify the impact of applying a patch to each of the devices individually based on sensitivity and susceptibility. In embodiments, sensitivity defines the sensitivity of data (for example, personal data, financial data, etc.) on that device on a scale from 0-100. In embodiments, susceptibility defines the probability that data loss could be incurred. In embodiments, software patch optimization module 110 makes the following assumptions in determining the Data Loss Risk Score: Data Loss Risk Score equals the aggregate function of % Change multiplied by Weight for each Factor; Weight is user-defined to distinguish a priority per factor; sum of all the weights equals 100.00; and Threshold defines a limit for each factor which determines a patch/no-patch decision for patching this particular device.

FIG. 9 is a chart showing an example of a Cost Impact Per Device and metrics used by software patch optimization module 110 to determine the Cost Impact Per Device for each of the devices on the virtual network in accordance with aspects of the invention. In embodiments, software patch optimization module 110 determines the Cost Impact Per Device for each device to quantify the impact of applying a patch to each of the devices individually based on expected downtime cost, cost associated with performance degradation, and the expected monetary impact of data loss. In embodiments, software patch optimization module 110 makes the following assumptions in determining the Cost Impact Per Device: Cost Impact Per Device equals the aggregate function of % Change multiplied by Weight for each Factor; Downtime Cost equals an expected time to patch the device multiplied by the cost of downtime; Performance Degradation Cost equals expected performance degradation (as a percentage) multiplied by a cost (per percent) of performance degradation; Expected Monetary Impact of Data Loss equals susceptibility multiplied by sensitivity; Weight is user-defined to distinguish a priority per factor; sum of all the weights equals 100.00; and Threshold defines a limit for each factor which determines a patch/no-patch decision for patching this particular device.

FIG. 10 is a chart showing a partial list of possible patch configurations (designated by Configurations ID #s) that, in embodiments, software patch optimization module 110 simulates and performance tests within the virtual environment (as virtual networks) in accordance with aspects of the invention. In embodiments, before any network performance tests are performed, software patch optimization module 110 identifies any no-patch scenarios on a device level and eliminates any configurations that include these no-patch devices. For example, no-patch scenarios include any instance in which a certain performance (for example, Device Performance Score), cost (for example, Cost Impact Per Device), or data loss risk (for example, Data Loss Risk Score) threshold was not met.

FIG. 11 is a chart showing an example of a Network Performance Score and metrics used by software patch optimization module 110 to determine the Network Performance Score for each of the configurations in FIG. 10, for example, in accordance with aspects of the invention. The Network Performance Score is used by software patch optimization module 110 to determine which of the possible patch configurations shown in FIG. 10 software patch optimization module 110 should test (tested configurations). In embodiments, the testing includes running device and network performance tests on each of the tested configurations. In embodiments, software patch optimization module 110 determines the Network Performance Score for each of the configurations shown in FIG. 10 to later determine if any of the configurations fail to reach a threshold performance. In embodiments, software patch optimization module 110 makes the following assumptions in determining the Network Performance Score: Network Performance Score equals the aggregate function of Degradation multiplied by Weight for each Factor; Weight is user-defined to distinguish a priority per factor; Sum of all the weights equals 100.00; and Threshold defines a limit for each factor which determines go/no-go decision for the particular patch configuration. If software patch optimization module 110 determines that the Network Performance Score for a particular configuration is below the Threshold, then software patch optimization module 110 will not test that configuration to determine a Total Configuration Score.

FIG. 12 is a chart showing an example of the Total Configuration Score used by software patch optimization module 110 to determine the Total Configuration Score for each of the configurations in FIG. 10 that software patch optimization module 110 determines should be tested (configurations to be tested) in accordance with aspects of the invention. In embodiments, software patch optimization module 110 analyzes the results of the device and system-level performance tests from each of the configurations to be tested against the baselined patchless network to determine the performance impact associated with various configurations of software patches. In embodiments, software patch optimization module 110 incorporates factors such as, for example, Data Loss Risk Score and Cost Impact Score into the calculation of the Total Configuration Score. Once the software patch optimization module 110 calculates the Total Configuration Score for each of the configurations to be tested, software patch optimization module 110 determines that the tested configuration with the highest Total Configuration Score is the optimal model for patching the devices on the network.

As software patch optimization module 110 calculates the Total Configuration Scores, in accordance with aspects of the invention, for each of the configurations to be tested, software patch optimization module 110 determines a go/no-go decision for each particular configuration using, for example, a Threshold Matrix as shown in FIG. 13. Software patch optimization module 110 eliminates any configuration which has any score below the respective threshold. Similar to factor-level thresholds described previously, in embodiments, user-inputted thresholds for each of the device and network-level scores further enhances the configuration selection process and ensure that the selected configuration meets the user's requirements.

Once software patch optimization module 110 calculates the Total Configuration Score for each of the configurations to be tested, the configuration with the highest score is determined to be the optimal model for patching the devices on the network. In this example, as shown in FIG. 14 and in accordance with aspects of the invention, software patch optimization module 110 determines that, from the configurations shown in FIG. 10, configuration C-15 has the highest Total Configuration Score (89.00) and, as a result, selects configuration C-15 as the optimal model for patching devices on the network. FIG. 15 shows that, in accordance with aspects of the invention, configuration C-15 includes applying the software patch to Devices A, C and E, but not Devices B and D.

Embodiments include software patch optimization module 110 monitoring data across the network devices and initiating a repeat of the above process and/or notifying a system administrator based on the crossing of thresholds associated with data risk loss or any other factor. In embodiments, monitoring includes monitoring for the release of new patches (software and/or firmware); one or more thresholds being breached; new devices being added to the network; and any other change that potentially effects network performance.

Figure 16:
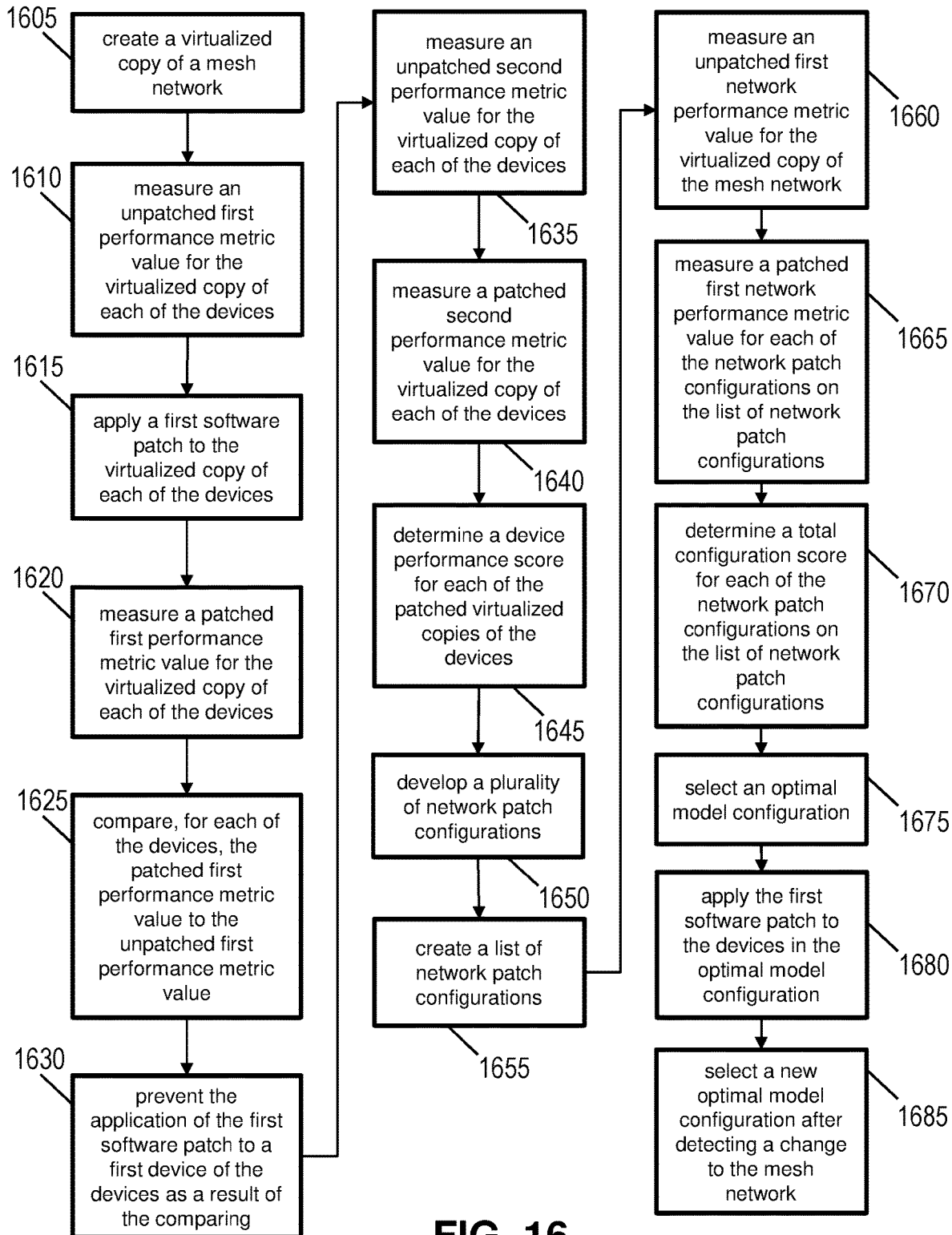
FIG. 16 shows a flowchart of an exemplary method in accordance with aspects of the invention.

FIG. 16 shows a flowchart of an exemplary method in accordance with aspects of the present invention. Steps of the method may be carried out in the environment of FIG. 4 and are described with reference to elements depicted in FIG. 4.

At step 1605, the system creates a virtualized copy of a mesh network. In embodiments, and as described with respect to FIG. 4, software patch optimization module 110 creates a virtualized copy of network 200, including device A 300, device B 310, and device C 320.

At step 1610, the system measures an unpatched first performance metric value for the virtualized copy of each of the devices. In embodiments, and as described with respect to FIG. 5, software patch optimization module 110 measures an unpatched first performance metric value for the virtualized copy of each of device A 300, device B 310, and device C 320.

At step 1615, the system applies a first software patch to the virtualized copy of each of the devices. In embodiments, and as described with respect to FIG. 4, software patch optimization module 110 applies a first software patch to the virtualized copy of each of device A 300, device B 310, and device C 320.

At step 1620, the system measures a patched first performance metric value for the virtualized copy of each of the devices. In embodiments, and as described with respect to FIG. 4, software patch optimization module 110 measures a patched first performance metric value for the virtualized copy of each of device A 300, device B 310, and device C 320.

At step 1625, the system compares, for each of the devices, the patched first performance metric value to the unpatched first performance metric value. In embodiments, and as described with respect to FIG. 7, software patch optimization module 110 compares, for each of device A 300, device B 310, and device C 320, the patched first performance metric value to the unpatched first performance metric value.

At step 1630, the system prevents the application of the first software patch to a first device of the devices as a result of the comparing. In embodiments, and as described with respect to FIG. 4, software patch optimization module 110 prevents the application of the first software patch to device A 300 as a result of the comparing.

At step 1635, the system measures an unpatched second performance metric value for the virtualized copy of each of the devices. In embodiments, and as described with respect to FIG. 5, software patch optimization module 110 measures an unpatched second performance metric value for the virtualized copy of each of device A 300, device B 310, and device C 320.

At step 1640, the system measures a patched second performance metric value for the virtualized copy of each of the devices. In embodiments, and as described with respect to FIG. 4, software patch optimization module 110 measures a patched second performance metric value for the virtualized copy of each of device A 300, device B 310, and device C 320.

At step 1645, the system determines a device performance score for each of the patched virtualized copies of the devices. In embodiments, and as described with respect to FIG. 4, software patch optimization module 110 determines a device performance score for each of the patched virtualized copies of device A 300, device B 310, and device C 320.

At step 1650, the system develops a plurality of network patch configurations. In embodiments, and as described with respect to FIG. 10, software patch optimization module 110 develops a plurality of network patch configurations of network 200.

At step 1655, the system creates a list of network patch configurations. In embodiments, and as described with respect to FIG. 10, software patch optimization module 110 creates a list of the network patch configurations of network 200 developed at step 1650.

At step 1660, the system measures an unpatched first network performance metric value for the virtualized copy of the mesh network. In embodiments, and as described with respect to FIG. 6, software patch optimization module 110 measures an unpatched first network performance metric value for the virtualized copy of network 200.

At step 1665, the system measures a patched first network performance metric value for each of the network patch configurations on the list of network patch configurations. In embodiments, and as described with respect to FIG. 11, software patch optimization module 110 measures a patched first network performance metric value for each of the network patch configurations on the list of network patch configurations created at step 1655.

At step 1670, the system determines a total configuration score for each of the network patch configurations on the list of network patch configurations. In embodiments, and as described with respect to FIG. 12, software patch optimization module 110 determines a total configuration score for each of the network patch configurations on the list of network patch configurations created at step 1655.

At step 1675, the system selects an optimal model configuration. In embodiments, and as described with respect to FIG. 14, software patch optimization module 110 selects an optimal model configuration from the network patch configurations scored in step 1670.

At step 1680, the system applies the first software patch to the devices in the optimal model configuration. In embodiments, and as described with respect to FIG. 15, software patch optimization module 110 applies the first software patch to the devices in the optimal model configuration to device B 310 and device C 320.

At step 1685, the system selects a new optimal model configuration after detecting a change to the mesh network. In embodiments, and as described with respect to FIG. 4, software patch optimization module 110 selects a new optimal model configuration after detecting a change to network 200.

Figure 17:
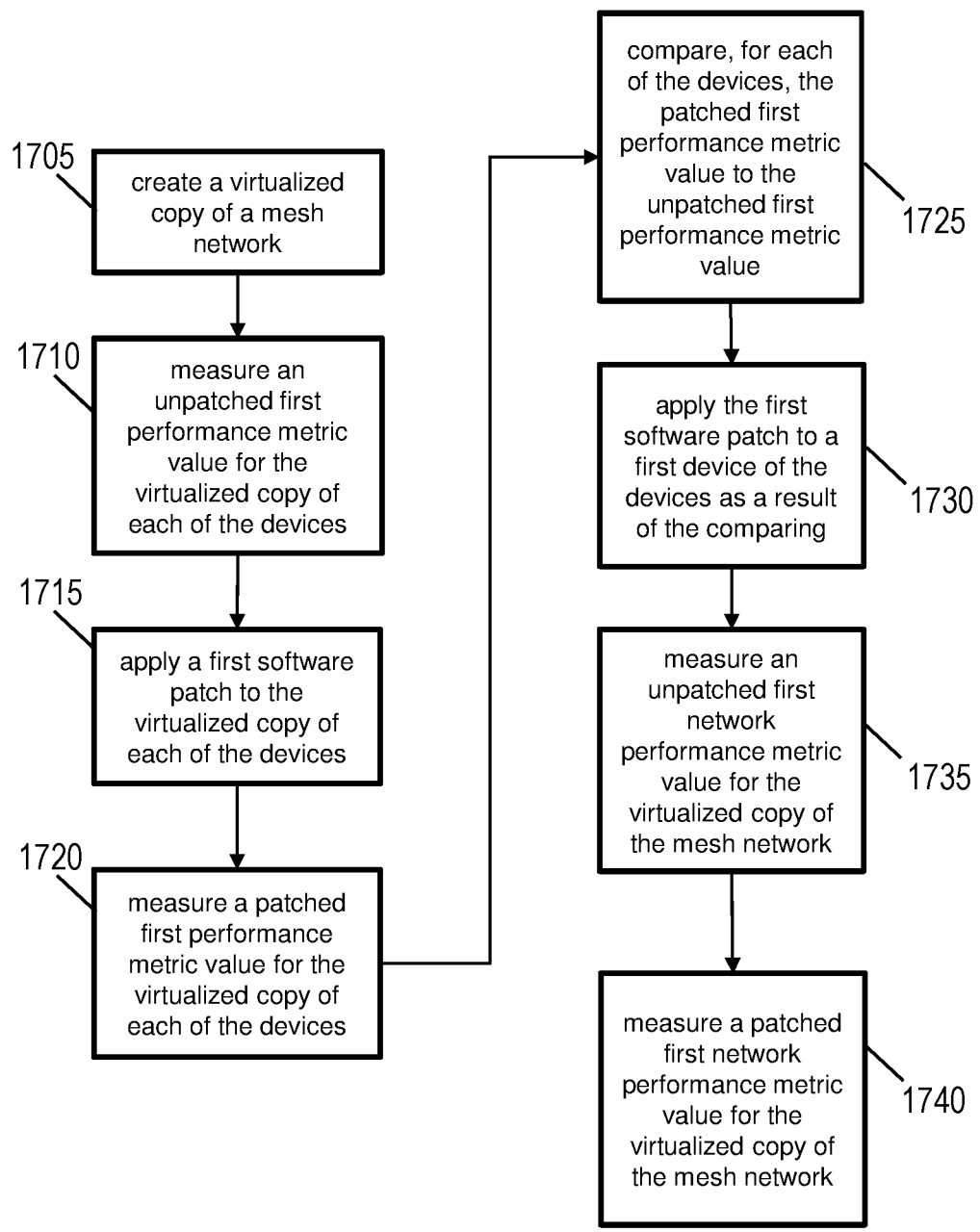
FIG. 17 shows a flowchart of an exemplary method in accordance with aspects of the invention.

FIG. 17 shows a flowchart of an exemplary method in accordance with aspects of the present invention. Steps of the method may be carried out in the environment of FIG. 4 and are described with reference to elements depicted in FIG. 4.

At step 1705, the system creates a virtualized copy of a mesh network. In embodiments, and as described with respect to FIG. 4, software patch optimization module 110 creates a virtualized copy of network 200.

At step 1710, the system measures an unpatched first performance metric value for the virtualized copy of each of the devices. In embodiments, and as described with respect to FIG. 5, software patch optimization module 110 measures an unpatched first performance metric value for the virtualized copy of each of device A 300, device B 310, and device C 320.

At step 1715, the system applies a first software patch to the virtualized copy of each of the devices. In embodiments, and as described with respect to FIG. 4, software patch optimization module 110 applies a first software patch to the virtualized copy of each of device A 300, device B 310, and device C 320.

At step 1720, the system measures a patched first performance metric value for the virtualized copy of each of the devices. In embodiments, and as described with respect to FIG. 4, software patch optimization module 110 measures a patched first performance metric value for the virtualized copy of each of device A 300, device B 310, and device C 320.

At step 1725, the system compares, for each of the devices, the patched first performance metric value to the unpatched first performance metric value. In embodiments, and as described with respect to FIG. 7, software patch optimization module 110 compares, for each of device A 300, device B 310, and device C 320, the patched first performance metric value to the unpatched first performance metric value.

At step 1730, the system applies the first software patch to a first device of the devices as a result of the comparing. In embodiments, and as described with respect to FIG. 4, software patch optimization module 110 applies the first software patch to device 300 as a result of the comparing at step 1725.

At step 1735, the system measures an unpatched first network performance metric value for the virtualized copy of the mesh network. In embodiments, and as described with respect to FIG. 6, software patch optimization module 110 measures an unpatched first network performance metric value for the virtualized copy of network 200.

At step 1740, the system measures a patched first network performance metric value for the virtualized copy of the mesh network. In embodiments, and as described with respect to FIG. 11, software patch optimization module 110 measures a patched first network performance metric value for the virtualized copy of network 200.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
creating, by a computer device, a virtualized copy of a mesh network, the virtualized copy of the mesh network comprising virtualized copies of a plurality of devices on the mesh network;
measuring, by the computer device, an unpatched first performance metric value for the virtualized copy of each of the devices, the unpatched first performance metric value being a value of a first performance metric for the virtualized copy of each of the devices before a first software patch is applied to the virtualized copies of the devices;
applying, by the computer device, the first software patch to the virtualized copy of each of the devices;
measuring, by the computer device, a patched first performance metric value for the virtualized copy of each of the devices, the patched first performance metric value being a value of the first performance metric for the virtualized copy of each of the devices after the applying;
comparing, by the computer device and for each of the devices, the patched first performance metric value to the unpatched first performance metric value;
preventing, by the computer device, the application of the first software patch to a first device of the devices as a result of the comparing;
developing, by the computer device, a plurality of network patch configurations, each of the network patch configurations having a different combination of patched and unpatched ones of the virtualized copies of the devices;
creating, by the computer device, a list of network patch configurations, the list of network patch configurations including only those ones of the network patch configurations that include only those ones of the virtualized copies of the devices that have a device performance score above a device performance score threshold; and
determining, by the computer device, a total configuration score for each of the network patch configurations on the list of network patch configurations, the total configuration score for a configuration being a combination of a patched first network performance metric value for the configuration, the patched first performance metric value for each device in the configuration, and a patched second performance metric value for each device in the configuration.

2. The computer-implemented method of claim 1, wherein the comparing indicates that the patched first performance metric value of the first device is below a threshold value.

3. The computer-implemented method of claim 2, further comprising:
measuring, by the computer device, an unpatched first network performance metric value for the virtualized copy of the mesh network, the unpatched first network performance metric value being a value of a first network performance metric for the virtualized copy of the mesh network before the first software patch is applied to any of the virtualized copies of the devices; and
measuring, by the computer device, a patched first network performance metric value for the virtualized copy of the mesh network, the patched first network performance metric value being a value of the first network performance metric for the virtualized copy of the mesh network after the applying.

4. The computer-implemented method of claim 3, wherein the preventing is further a result of comparing the patched first network performance metric value to the unpatched first network performance metric value.

5. The computer-implemented method of claim 4, wherein the comparing of the patched first network performance metric value to the unpatched first network performance metric value indicates that the patched first network performance metric value is below a network threshold value.

6. The computer-implemented method of claim 5, further comprising developing, by the computer device, a plurality of network patch configurations, each of the network patch configurations having a different combination of patched and unpatched ones of the virtualized copies of the devices.

7. The computer-implemented method of claim 2, further comprising:
measuring, by the computer device, an unpatched second performance metric value for the virtualized copy of each of the devices, the unpatched second performance metric value being a value of a second performance metric for the virtualized copy of each of the devices before the first software patch is applied to the virtualized copies of the devices; and
measuring, by the computer device, the patched second performance metric value for the virtualized copy of each of the devices, the patched second performance metric value being a value of the second performance metric for the virtualized copy of each of the devices after the applying.

8. The computer-implemented method of claim 7, further comprising determining, by the computer device, a device performance score for each of the patched virtualized copies of the devices, the device performance score being a weighted combination of the patched first performance metric value and the patched second performance metric value.

9. The computer-implemented method of claim 8, further comprising:
measuring, by the computer device, an unpatched first network performance metric value for the virtualized copy of the mesh network, the unpatched first network performance metric value being a value of a first network performance metric for the virtualized copy of the mesh network before the first software patch is applied to any of the virtualized copies of the devices; and
measuring, by the computer device, the patched first network performance metric value for each of the network patch configurations on the list of network patch configurations, the patched first network performance metric value for a configuration being a value of the first network performance metric for the configuration after the applying.

10. The computer-implemented method of claim 9, further comprising selecting, by the computer device, an optimal model configuration from the network patch configurations on the list of network patch configurations based on the total configuration score.

11. The computer-implemented method of claim 10, further comprising applying, by the computer device, the first software patch to the devices in the optimal model configuration.

12. The computer-implemented method of claim 11, further comprising:
monitoring, by the computer device, the mesh network for a change to the mesh network; and
selecting, by the computer device, a new optimal model configuration after incorporating a detected change to the mesh network into a new virtualized copy of the mesh network, the new optimal model configuration being selected using the same method as selecting the optimal model configuration,
wherein the change to the mesh network is at least one selected from the group consisting of:
adding a device;
removing a device; and
an existence of a second software patch.

13. The computer-implemented method of claim 1, wherein the computer device includes software provided as a service in a cloud computing environment.

14. A computer program product, the computer program product comprising one or more computer readable storage media having program instructions collectively stored on the one or more computer readable storage media, the program instructions executable to:
create a virtualized copy of a mesh network, the virtualized copy of the mesh network comprising virtualized copies of a plurality of devices on the mesh network;
measure an unpatched first performance metric value for the virtualized copy of each of the devices, the unpatched first performance metric value being a value of a first performance metric for the virtualized copy of each of the devices before a first software patch is applied to the virtualized copies of the devices;
apply the first software patch to the virtualized copy of each of the devices;
measure a patched first performance metric value for the virtualized copy of each of the devices, the patched first performance metric value being a value of the first performance metric for the virtualized copy of each of the devices after the applying;
compare, for each of the devices, the patched first performance metric value to the unpatched first performance metric value;
apply the first software patch to a first device of the devices as a result of the comparing; and
determine a total configuration score for each network patch configuration on a list of network patch configurations, the total configuration score for a configuration being a combination of a patched first network performance metric value for the configuration, the patched first performance metric value for each device in the configuration, and a patched second performance metric value for each device in the configuration.

15. The computer program product of claim 14, wherein the program instructions further cause the computing device to:
   measure an unpatched first network performance metric value for the virtualized copy of the mesh network, the unpatched first network performance metric value being a value of a first network performance metric for the virtualized copy of the mesh network before the first software patch is applied to any of the virtualized copies of the devices; and
   measure a patched first network performance metric value for the virtualized copy of the mesh network, the patched first network performance metric value being a value of the first network performance metric for the virtualized copy of the mesh network after the applying, and
   the applying the first software patch to the first device is further a result of comparing the patched first network performance metric value to the unpatched first network performance metric value.

16. The computer program product of claim 14, wherein the program instructions further cause the computing device to:
   develop a plurality of network patch configurations, each of the network patch configurations having a different combination of patched and unpatched ones of the virtualized copies of the devices; and
   create the list of network patch configurations, the list of network patch configurations including only those ones of the network patch configurations that include only those ones of the virtualized copies of the devices that have a device performance score above a device performance score threshold.

17. A system comprising:
   a processor, a computer readable memory, and one or more computer readable storage media;
   program instructions to create a virtualized copy of a mesh network, the virtualized copy of the mesh network comprising virtualized copies of a plurality of devices on the mesh network;
   program instructions to measure an unpatched first performance metric value for the virtualized copy of each of the devices, the unpatched first performance metric value being a value of a first performance metric for the virtualized copy of each of the devices before a first software patch is applied to the virtualized copies of the devices;
   program instructions to apply the first software patch to the virtualized copy of each of the devices;
   program instructions to measure a patched first performance metric value for the virtualized copy of each of the devices, the patched first performance metric value being a value of the first performance metric for the virtualized copy of each of the devices after the applying;
   program instructions to compare, for each of the devices, the patched first performance metric value to the unpatched first performance metric value;
   program instructions to prevent the application of the software patch to a first device of the devices as a result of the comparing; and
   program instructions to determine a total configuration score for each network patch configuration on a list of network patch configurations, the total configuration score for a configuration being a combination of a patched first network performance metric value for the configuration, the patched first performance metric value for each device in the configuration, and a patched second performance metric value for each device in the configuration,
   wherein the program instructions are stored on the one or more computer readable storage media for execution by the processor via the computer readable memory.

18. The system of claim 17, further comprising:
   program instructions to measure an unpatched second performance metric value for the virtualized copy of each of the devices, the unpatched second performance metric value being a value of a second performance metric for the virtualized copy of each of the devices before the first software patch is applied to the virtualized copies of the devices; and
   program instructions to measure a patched second performance metric value for the virtualized copy of each of the devices, the patched second performance metric value being a value of the second performance metric for the virtualized copy of each of the devices after the applying.

19. The system of claim 17, further comprising:
   program instructions to develop a plurality of network patch configurations, each of the network patch configurations having a different combination of patched and unpatched ones of the virtualized copies of the devices; and
   program instructions to create the list of network patch configurations, the list of network patch configurations including only those ones of the network patch configurations that include only those ones of the virtualized copies of the devices that have a device performance score above a device performance score threshold.

* * * * *